United States Patent
Tomforde et al.

[11] Patent Number: 5,649,735
[45] Date of Patent: Jul. 22, 1997

[54] PASSENGER CAR CELL WITH LOAD-BEARING SHELL STRUCTURE

[75] Inventors: Johann Tomforde, Sindelfingen; Bernhard Joseph, Leonberg; Hubert Scheper, Weil der Stadt; Ralph Staud, Saulgau; Stefan Mayr, Neu-Isenburg; Oliver Neuland, Künzell; Axel Kleinschmidt, Taunusstein; Christoph Severin, Frankfurt, all of Germany

[73] Assignee: Mercedes-Benz AG, Germany

[21] Appl. No.: 358,178

[22] Filed: Dec. 16, 1994

[30] Foreign Application Priority Data

Dec. 16, 1993 [DE] Germany ............ 43 42 960.2

[51] Int. Cl.$^6$ ................................. B60N 3/02
[52] U.S. Cl. ........................... 296/71; 105/354
[58] Field of Search ............... 296/71; 105/354

[56] References Cited

U.S. PATENT DOCUMENTS 2,768,590  10/1956  Otto et al. ............... 105/354
4,072,339   2/1978  Rothlisberger.

FOREIGN PATENT DOCUMENTS

| 883407 | 6/1953 | Germany. |
| 946 116 | 7/1956 | Germany. |
| 1 289 755 | 10/1969 | Germany. |
| 27 35 531 | 2/1979 | Germany. |
| 8212608 U | 1/1984 | Germany. |
| 717544 | 10/1959 | United Kingdom. |

*Primary Examiner*—Joseph D. Pape
*Attorney, Agent, or Firm*—Evenson, McKeown, Edwards & Lenahan, P.L.L.C.

[57] ABSTRACT

A passenger cell for a passenger car with a load bearing shell structure. The A-pillar and the adjoining lateral roof frame each have a two-part longitudinal profile. The two longitudinal profile parts are arranged at a distance from each other and an inner longitudinal profile part protruding into the interior as a roof gripping rail.

5 Claims, 2 Drawing Sheets

PASSENGER CAR CELL WITH LOAD-BEARING SHELL STRUCTURE

BACKGROUND AND SUMMARY OF THE INVENTION

The present invention relates to a passenger cell for a passenger car with a load-bearing shell structure, which in each case as lateral frame members has an A-pillar and an adjoining lateral roof frame, and with lateral roof gripping rails arranged at least above the seat position of the front seats.

German Patent No. 883 407 and German Patent No. 946 116 show that the interior of a passenger cell of a passenger car can be provided with gripping bars which are arranged above the side doors and extend over the length of the interior. The gripping bars are secured from the inside to the shell structure of the passenger cell.

German Utility Model No. 82 12 608, German Patent No. 12 89 755 and German Offenlegungsschrift 27 35 531 describe gripping rails, which are secured in the region of the roof frame of a passenger cell and protrude into the interior, being configured additionally as head protection for vehicle passengers.

All of the known gripping arrangements in the interior of the passenger cell are, however, attached to the particular frame parts of the passenger cell by securing elements.

An object of the present invention is to provide a passenger cell with a load-bearing shell structure which does not require any additional fitting of gripping rails.

This object has been achieved in accordance with the present invention providing that the A-pillar and the adjoining lateral roof frame each have a two-part longitudinal profile. The two longitudinal profile parts are arranged at a distance from each other and an inner longitudinal profile part protruding into the interior as a roof gripping rail. The present invention renders unnecessary the additional fitting of hand grips, gripping rails or gripping bars. Also, the inner longitudinal profile part additionally takes on a contributory load-bearing shell function since the two longitudinal profile parts are load-bearing elements of the shell structure. Because the inner longitudinal profile part extends over the length of the side members of the A-pillar and the adjoining lateral roof rails, a gripping region exists in the region of the entire seat position of the front seats and serves as an entry and exit aid.

In an embodiment of the invention, the longitudinal profile has a web connecting the two longitudinal profile parts to each other over their length. As a result, the longitudinal profile can be produced as a component which has the two longitudinal profile parts arranged at a distance from each other.

In a further embodiment of the present invention, the inner longitudinal profile part has a hollow profile which is fixed in the region of its end faces into the shell structure. The longitudinal profile therefore comprises two parts which are both fitted into the shell structure.

In yet a further embodiment of the present invention, the inner longitudinal profile part is surrounded by a gripping profile. As a result, the function of the inner longitudinal profile part as a gripping rail is improved since the gripping profile can be configured with ergonomic considerations in mind.

The gripping profile may also have an energy-absorbing padding to additionally serve as impact protection.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
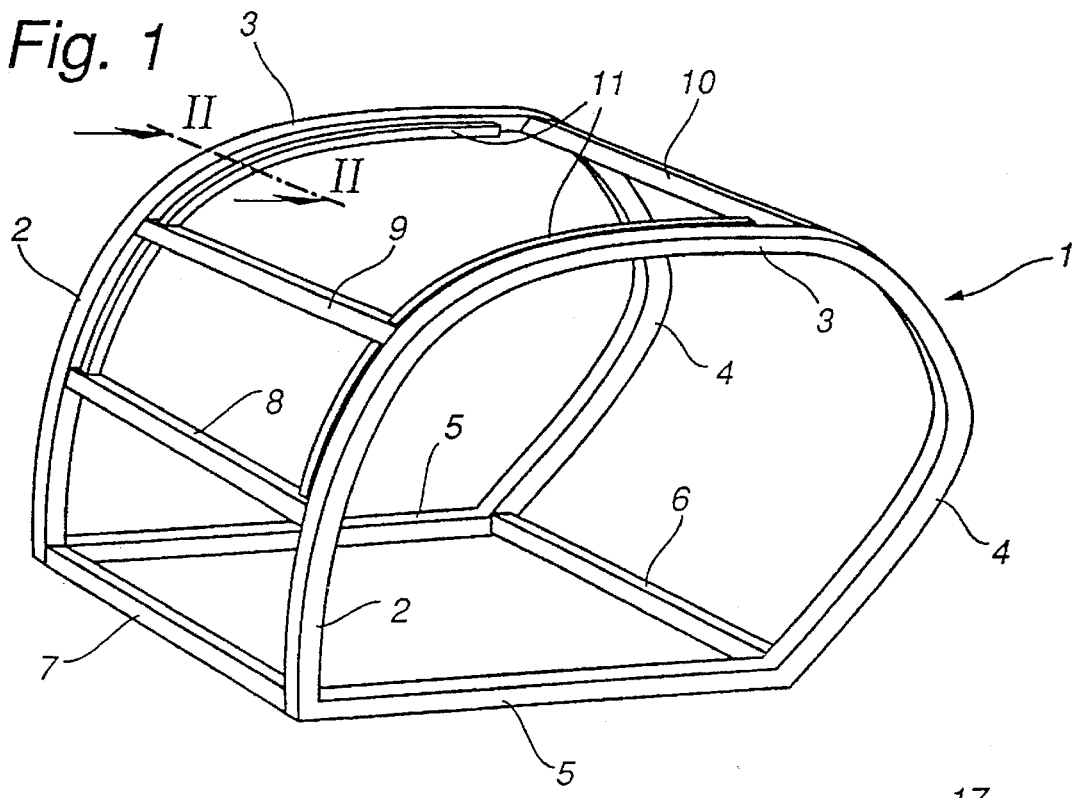
FIG. 1 is a schematic perspective view of an embodiment of a passenger cell for a passenger car according to the present invention.

A passenger cell 1 shown in FIG. 1 has a load-bearing shell structure which is provided with a floor assembly and a body assembly. The floor assembly of the shell structure of the passenger cell 1 comprises two lateral longitudinal members 5 and a front cross-member 7 and a rear cross-member 6 as viewed on the direction of travel of the passenger car 6. Upwardly adjoining the front and the rear end of each lateral longitudinal member 5 is a curved, lateral frame member 2, 3, 4, which is curved approximately in a vertical longitudinal plane above the lateral longitudinal member 5. Each lateral frame member 2, 3, 4 has an A-pillar 2 which extends upwards from the connection between the joining points of the front crossmember 7 and the lateral longitudinal member 5.

In a roof region of the passenger cell 1, the A-pillar 2 merges into a lateral roof frame 3. Adjoining the roof frame 3, as viewed in the travel direction, to the rear is a C-pillar 4, the other end of which is connected to the floor assembly at the connecting point between the rear cross-member 6 and lateral longitudinal member 5.

In addition to these lateral frame members 2, 3, 4, the body assembly has three cross-members 8, 9, 10, of which the cross-members 8 and 9 connect the A pillars 2 and the cross-member 10 connects the C-pillars 4. No B-pillars are provided in this passenger shell structure 1. The cross-member 8 extends between the two A-pillars 2 at the level of an instrument panel (not illustrated) of the passenger cell 1, and the cross member 9 forms the upper windscreen frame in the roof region. The passenger cell 1 is provided for a two doored passenger car. Although the invention is explained in further detail below with regard to a two-door car, it can, however, also be used in the same manner for four-seated passenger cars with four side doors.

The A-pillar 2 and the roof frame 3 on each side of the passenger cell 1 are provided with a longitudinal profile which, approximately from the level of the cross-member 8 until shortly before the crossmember 10 is reached, is in two parts in the longitudinal direction. The additionally formed longitudinal profile part 11 protrudes inwards into the interior of the passenger cell 1. This longitudinal profile part 11 therefore represents a load-bearing element of the shell structure, as does the outer longitudinal profile in each case of the A-pillar 2 and of the roof frame 3. In addition, the inner longitudinal profile part 11 serves as a gripping rail for vehicle passengers, thus producing an entry and exit aid.

Because the inner longitudinal profile part 11 extends from the level of the instrument panel over the entire region of the seat position of the front seats and into the region of the rear compartment, a relatively large gripping region is provided which makes it possible for vehicle passengers to have easy access both to the front seats and to the rear compartment. The vehicle passengers can therefore additionally hold onto and support themselves against the gripping rail formed in this manner when getting in or out.

Figure 2:
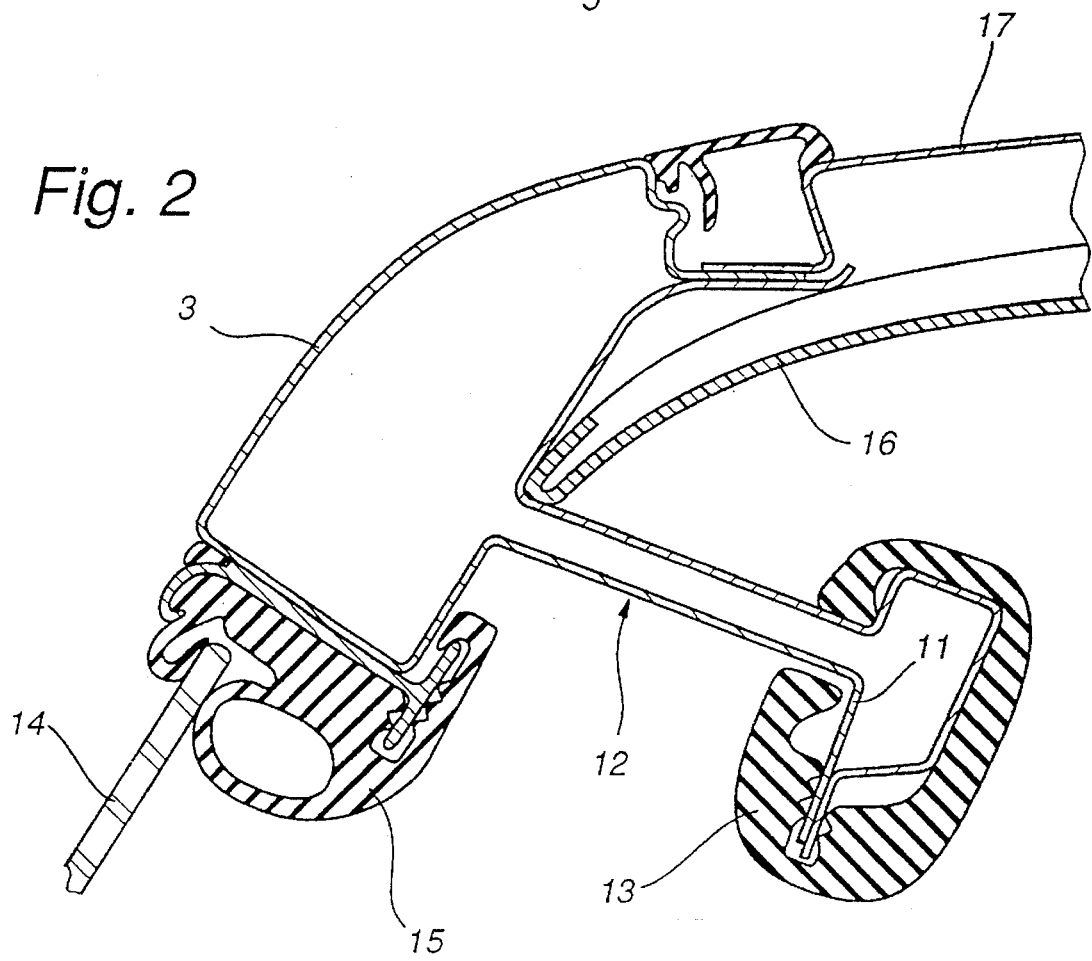
FIG. 2 is a sectional view of a lateral frame member of the passenger cell, along line II—II of FIG. 1, with lining and functional elements of the passenger cell additionally being added to the schematically shown shell structure of FIG. 1.

In the embodiment of FIG. 2, the outer longitudinal profile part and the inner longitudinal profile part 11 are produced as one component. The two longitudinal profile parts are connected to each other by a longitudinally extending web 12. The longitudinal profile can therefore be produced in a manner such that it is already complete prior to being fixed into the shell structure of the passenger cell 1. The longitudinal profile formed in this manner has an approximately H-shaped hollow profile.

A gripping profile 13, which is made of plastic, is formed around the hollow profile of the longitudinal profile part 11. The entire shell structure is produced from sheet-metal parts in a manner known per se. The gripping profile 13 is provided with an energy-absorbing padding which, in addition to the gripping function, forms an impact protection for the heads of vehicle passengers. Above the longitudinal profile part 11, adjoining in a manner known per se, are a roofliner 16 and a roof 17. Downwardly adjoining the roof frame 3, in a manner which is likewise known per se, are a side-window seal 15 and a side window 14.

Figure 3:
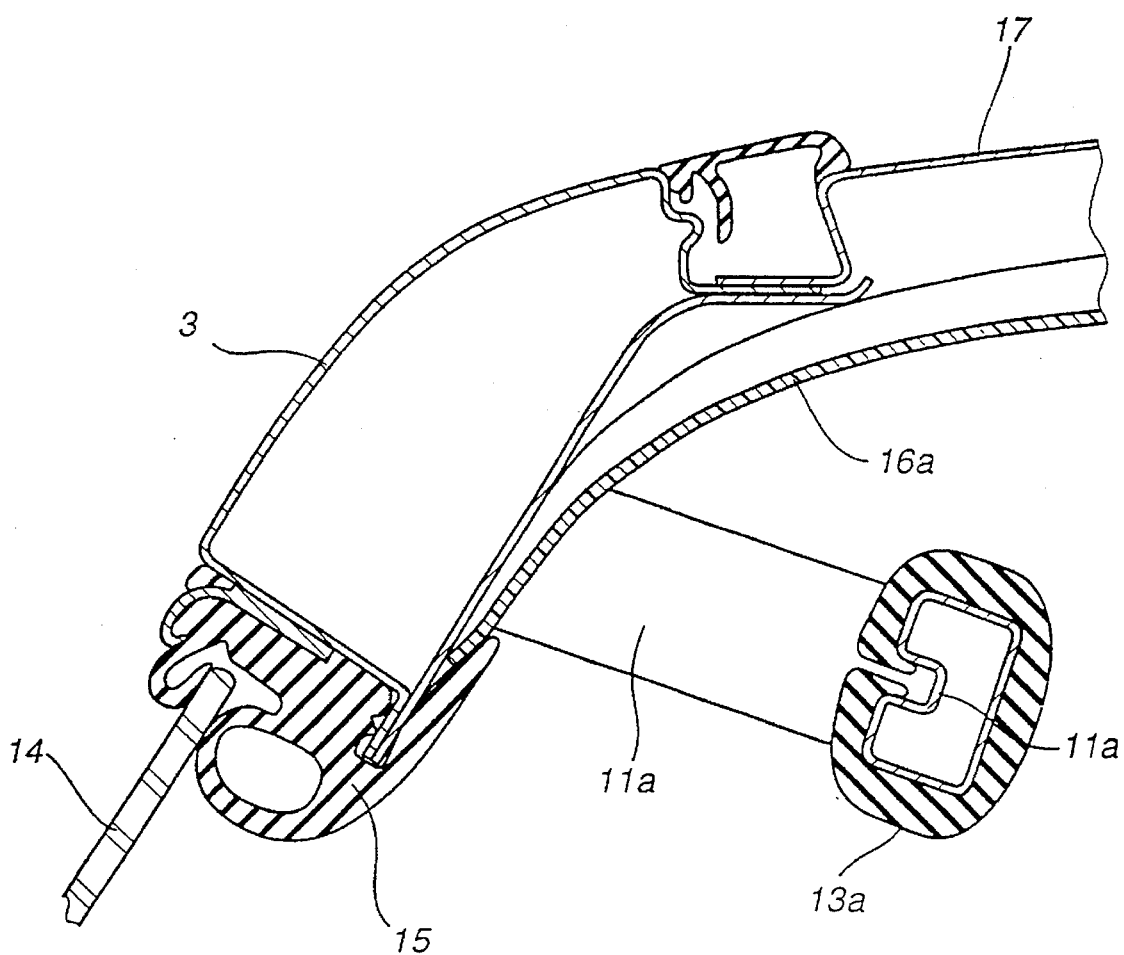
FIG. 3 is a sectional view similar to FIG. 2, in which the lateral frame member is provided with two profile parts arranged at a distance from each other.

In the embodiment of FIG. 3, the inner longitudinal profile part 11a is fixed into the shell structure as a component which is separate from the outer longitudinal profile part of the roof frame 3. The longitudinal profile part 11a therefore forms a bow-like support, the opposite end faces of which are fixed rigidly into the A-pillar 2 and into the rear end of the roof frame 3. The longitudinal profile part 11a likewise represents a load-bearing element of the shell structure.

The longitudinal profile part 11a is likewise surrounded by a gripping profile 13a which is held in a form-fitting manner on the longitudinal profile part 11a. For this purpose, the longitudinal profile part 11a has on its outer side, which is directed towards the roof rail 3, a longitudinal groove into which corresponding projections on the gripping profile 13a protrude. A roofliner 16a and a roof 17 as well as a window-sealing profile 15 and a side window 14 are provided, in a manner known per se.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A passenger cell for a passenger car with a loadbearing shell structure, comprising lateral frame members each forming an A-pillar and an adjoining lateral roof frame formed in one continuous piece with a lateral roof gripping rail at least above a seat position of front seats in an interior of the passenger car, wherein each roof gripping rail comprises longitudinal profile parts protruding into an interior of the passenger car.

2. The passenger cell according to claim 1, wherein each of the longitudinal profile parts of a respective roof gripping rail has a web arranged to connect the longitudinal profile parts to each other over the length thereof.

3. The passenger cell according to claim 1, wherein the longitudinal profile parts of a respective roof gripping rail define a hollow profile which is fixed in the region of end faces thereof into the shell structure.

4. The passenger cell according to claim 1, wherein the longitudinal profile parts of a respective roof gripping rail is surrounded by a gripping profile.

5. The passenger cell according to claim 4, wherein the gripping profile has an energy-absorbing padding.

* * * * *